United States Patent [19]
Birbragher

[11] Patent Number: 4,738,416
[45] Date of Patent: Apr. 19, 1988

[54] NACELLE ANTI-ICING SYSTEM

[75] Inventor: Fernando Birbragher, Miami, Fla.

[73] Assignee: Quiet Nacelle Corporation, Miami, Fla.

[21] Appl. No.: 911,881

[22] Filed: Sep. 26, 1986

[51] Int. Cl.$^4$ ............................................. B64D 15/04
[52] U.S. Cl. .................. 244/134 B; 244/207; 60/39.093
[58] Field of Search .............. 244/207, 134 R, 134 B; 60/39.093

[56] References Cited

U.S. PATENT DOCUMENTS

| | | | |
|---|---|---|---|
| 2,447,095 | 8/1948 | Schmidt | 244/134 B |
| 2,478,878 | 8/1949 | Smith et al. | 244/134 B |
| 2,634,049 | 4/1953 | Hodges et al. | 60/39.093 |
| 3,933,327 | 1/1976 | Cook et al. | 244/134 B |
| 3,981,466 | 9/1976 | Shah | 60/39.093 |
| 4,240,250 | 12/1980 | Harris | 60/39.093 |
| 4,482,114 | 11/1984 | Gupta et al. | 244/134 B |

FOREIGN PATENT DOCUMENTS

| | | | |
|---|---|---|---|
| 871408 | 1/1942 | France | 244/134 B |
| 1032681 | 6/1966 | United Kingdom | 244/134 B |

OTHER PUBLICATIONS

European Patent Application, "Duct for Hot Air" No. 0178144, pub. 4–1986.

*Primary Examiner*—Galen Barefoot
*Attorney, Agent, or Firm*—Oblon, Fisher, Spivak, McClelland & Maier

[57] ABSTRACT

A nacelle anti-icing system for a jet engine and a method for preventing icing of the nacelle. The nacelle anti-icing system includes a nose cowling assembly having a nose ring and an inlet duct connected to the nose ring, the nose ring including a plurality of openings formed therein; a nose cowling conduit positioned in the nose ring for communicating a heated gas to the plurality of openings formed in the nose ring and for creating a heated gas boundary layer on the inlet duct; and a mechanism connected to the nose cowling conduit for generating the heated gas. The method includes the steps of feeding a heated gas through the nose cowling conduit and through a plurality of openings formed in the nose ring and generating a heated gas boundary layer on the inlet duct so as to heat the inlet duct.

10 Claims, 4 Drawing Sheets

NACELLE ANTI-ICING SYSTEM

BACKGROUND OF THE INVENTION

1. Field of the Invention

The present invention is directed to a nacelle anti-icing system for a jet engine and in particular to an anti-icing system wherein a heated gas boundary layer is formed along the inlet duct and bullet of the jet engine so as to prevent icing.

2. Description of the Prior Art

It is conventional in anti-icing systems to provide a nose cowling assembly 1 shown in FIG. 1 which includes an air feed duct 2 for feeding air heated to 350° such that such heated air is in communication with conduit 4 so as to heat the adjacent skin layer of the noise cowling and prevent freezing of runback moisture. Also shown in FIG. 1 is the bullet 6 which is positioned radially within nose cowling assembly 1.

A drawback of the prior art shown in FIG. 1 is that conduit 4 must be provided along the inner surface of the nose cowling assembly which is complex in construction and prevents the use of any noise abatement material in that such prevents installation of any acoustical material within the nose cowling for minimizing the noise generated by the engine. In addition, means are required for feeding of heated air at a sufficiently high temperature of 350° wherein air heated to such extreme temperature must be provided through a complex construction of conduit 4 which thus leads to a complicated total structure for the nose cowling assembly 1 in the conventional jet engine.

SUMMARY OF THE INVENTION

The present invention serves to avoid the drawbacks of the prior art by allowing for venting of air heated to a lower temperature along the boundary layer of the inlet duct of the jet engine, thus creating a film of heated air to prevent formation of runback ice. In addition, such system allows for excess air to be dumped between the duct wall and the external skin so as to thus warm the duct wall from behind.

In accordance with the present invention, a nacelle anti-icing system for a jet engine is provided which includes a nose cowling assembly which includes a nose ring and an inlet duct connected to said nose ring, said nose ring including a plurality of openings formed therein; nose cowling conduit means positioned in said nose ring for communicating a heated gas to said plurality of openings formed in said nose ring and for creating a heated gas boundary layer on said inlet duct as well as means connected to said nose cowling conduit means for generating the heated gas.

A further object of the present invention is to provide a method for preventing icing of a nacelle for a jet engine having a nose cowling assembly which includes a nose ring, an inlet duct connected to said nose ring, said nose ring including a plurality of openings formed therein, and nose cowling conduit means positioned in said nose ring and connected to said plurality of openings, which includes the steps of feeding a heated gas to the nose cowling conduit means and through the plurality of openings formed in the nose ring and thus generating a heated gas boundary layer on the inlet duct so as to heat the inlet duct.

A further object of the present invention is to provide a bullet assembly positioned radially within the nose cowling assembly and which includes a tip portion and a body portion connected to the tip portion, the tip portion including a plurality of openings formed therein, and bullet conduit means positioned in the bullet assembly and connected to the means for generating the heated gas for communicating the heated gas to an interior portion of the tip portion and to the plurality of openings formed in the tip portion for creating a heated gas boundary on the body portion of the bullet assembly.

A further object of the present invention is to provide the foregoing bullet assembly and for the method to include the steps of creating a heated gas boundary layer on the body portion of the bullet assembly and within an interior portion of the bullet tip portion so as to avoid icing of the bullet assembly.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENT

Figure 1:
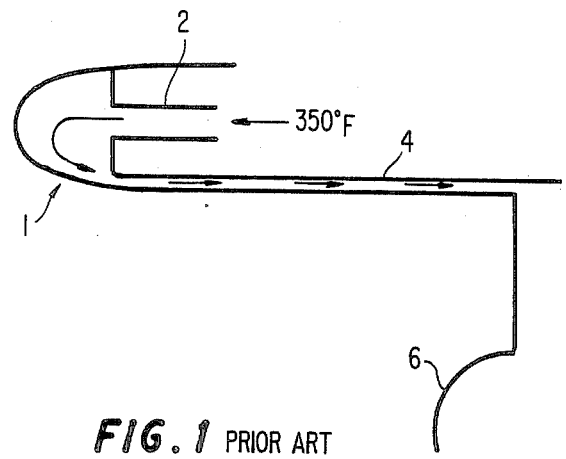
FIG. 1 shows a conventional anti-icing system for a jet engine.
Figure 2:
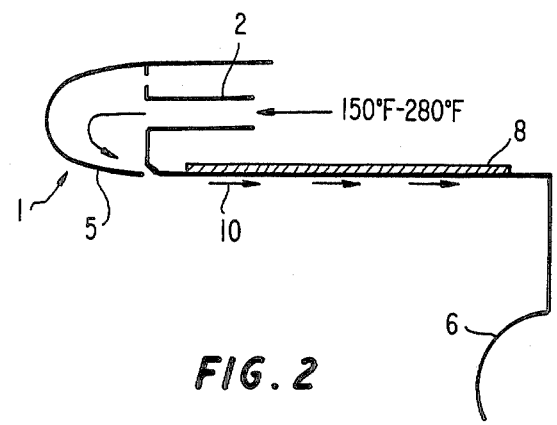
FIG. 2 shows the nacelle anti-icing system for a jet engine in accordance with the present invention.

The nacelle anti-icing system in accordance with the present invention utilizes, as shown in FIG. 2, a nose cowling assembly 1 which is in communication with a heated air feed duct 2 wherein air heated only to a range of 150° F. to 280° F. is fed along a composite inlet duct 8 and through a hole or opening 9 so as to form a heated air boundary layer 10 along the surface of composite inlet duct 8. Also shown is a nose ring 5 disposed upstream of the composite inlet duct 8.

Figure 3:
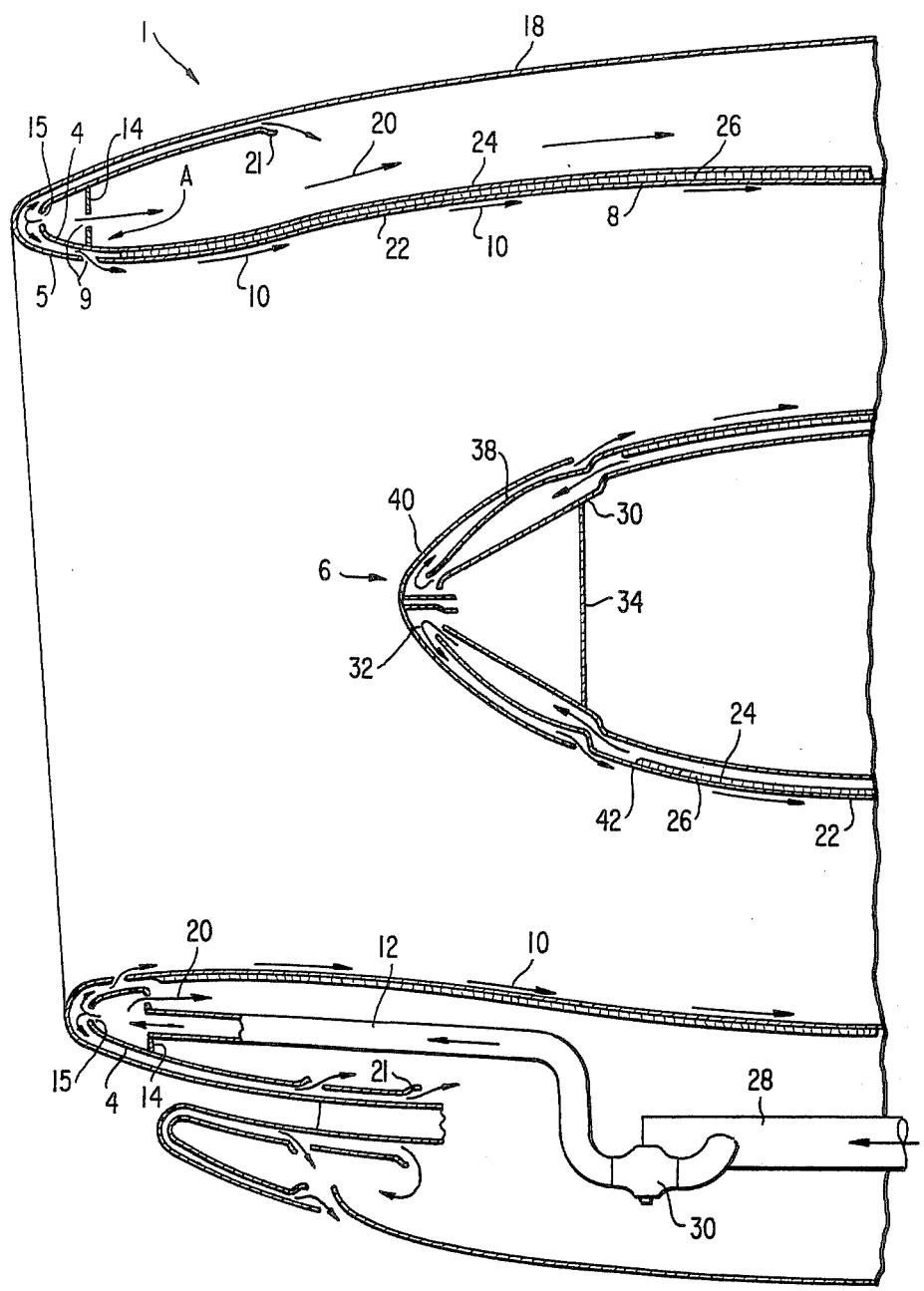
FIG. 3 shows an enlarged cross-sectional view of the nacelle anti-icing system in accordance with the present invention.

As best shown in FIG. 3, the nacelle anti-icing system is also characterized by the use of an intermediate conduit 12 for feeding the heated air to the region of nose ring 5 through an opening provided in nose cowling bulkhead 14. The direction of air flow is as indicated by the directional arrows shown in such figure. As can be appreciated from a review of such drawing, the heated air is allowed to flow through an opening 15, into a conduit 4 formed along the nose ring 5 and along the outer circumferential surface portion 16 of nose ring 5. The air flow is allowed to flow in a downstream direction and be discharged from discharge port 21 so as to first flow along the interior surface of outer circumferential surface portion 16 of the nose ring 5 and then along the outer circumferential surface portion 18 of the nose cowling assembly. Excess flow 20 is also allowed to escape through the nose cowling bulkhead 14 and flow along the interior portion of the nose cowling assembly so as to provide additional heating within the assembly itself.

An inner face sheet 22, an outer face sheet 24 and honey comb structure 26 interconnecting inner face sheet 22 and outer face sheet 24 are also provided so as to form the composite inlet duct 8. Accordingly, the composite inlet duct 8 forms an acoustical sandwich panel as described in greater detail in corresponding U.S. application Ser. No. 911,994, filed by Applicant and entitled "Noise Reduction Nacelle", which consists of a perforated inner face sheet 22, the honey comb structure 26 and outer face sheet 24. The hot air fed through intermediate conduit 12 is fed through a hot air supply duct 28 and then through an anti-ice valve 30.

Also shown in FIG. 3 are details of the bullet assembly bleed air system 32 which includes a bullet assembly bulkhead 34, a bullet assembly primary conduit 36, a secondary conduit bullet assembly 38 and a bullet assembly tip portion 40 which is structurally supported by bulkhead 34. Apertures are provided through the bulkhead 34 so as to allow for air flow through bullet assembly primary conduit 36, through bullet assembly secondary conduit 38 along the surface portion of bullet assembly tip portion 40 and then along composite bullet body portion 42 consisting of perforated inner face sheet 22, outer face sheet 24 and honey comb structure 26 disposed therebetween.

Figure 4A:
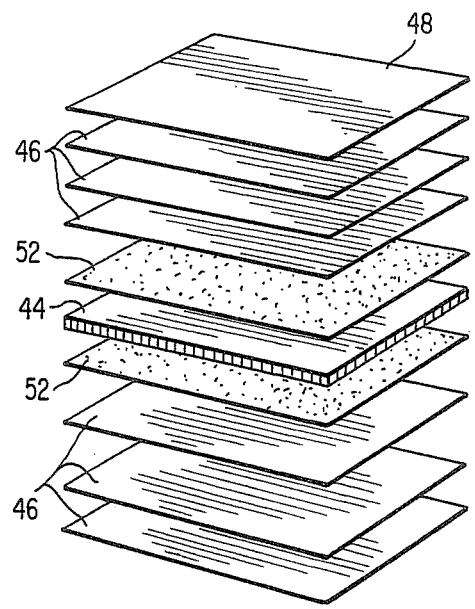
FIGS. 4a and 4b show a first and second embodiment of an acoustical lining utilized in accordance with the present invention.
Figure 4B:
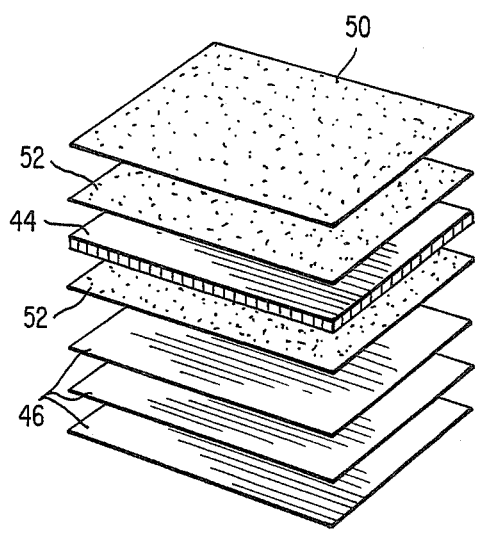

As shown in FIGS. 4a and 4b showing alternate embodiments of the acoustical lining, the acoustical lining in the form of perforated inner face sheet 22, honeycomb structure 26 and outer face sheet 24 is formed by bonding the same together by a film adhesive film 52. More particularly, the structure may include a Nomex Aramid honeycomb core 44, a preimpregnated graphite fabric 46, a fiberglass fabric 48, a perforated aluminum sheet 50 and an adhesive film 52.

Figure 5:
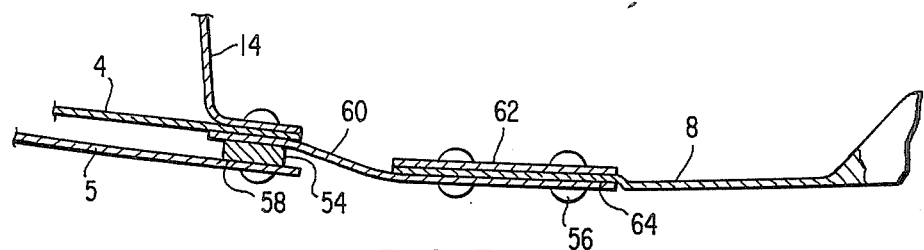
FIG. 5 shows a cross-sectional view of region A appearing in FIG. 3.
Figure 6:
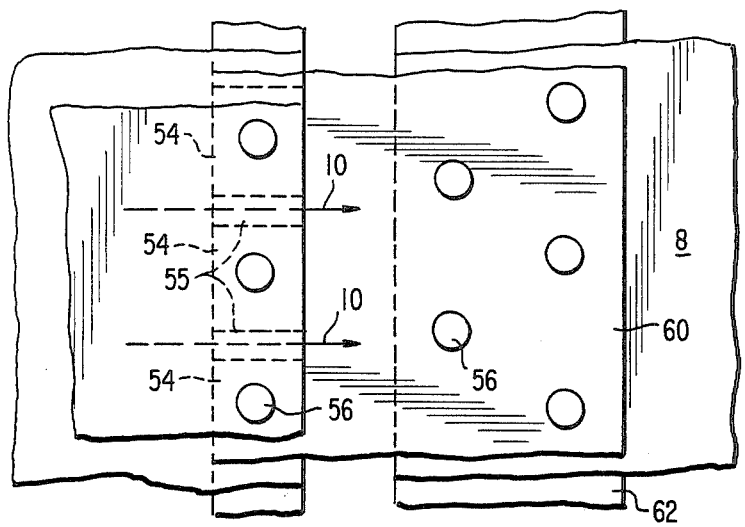
FIG. 6 illustrates a fragmentary elevational view of the structure shown in FIG. 5.

Shown in FIG. 5 is a cross-sectional view of region A of FIG. 3 with it being understood that a corresponding region is formed between the tip portion 40 of bullet assembly air bleed system 32 and the composite bullet body portion 42. More particularly, FIG. 5 serves to indicate the utilization of a plurality of spacer members 54 positioned on the outer circumference of bulkhead 14 and which form passages 55 therebetween as shown in the fragmentary elevational view of FIG. 6. Passages 55 allow for air flow from conduit 4 to 5 pass between spacers 54 so as to then flow downstream and form the boundary layer along composite inlet duct 8. Rivet members 56 serve to connect nose ring 5 to bulkhead 14 wherein an end portion of conduit 4 and a corresponding end portion of strap 60 are also connected by rivet members 56. Also provided are strap member 62 wherein an end portion of composite inlet duct 8 is connected between one end portion of strap 60 and strap 62 by adhesive 64. In addition, rivet members 56 also are used to interconnect strap 62, an end portion of inlet duct 8 and an end portion of strap 60.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A nacelle anti-icing system for a jet engine, comprising:

a nose cowling assembly which includes a nose ring and an inlet duct connected to said nose ring and having an inner and outer circumferential surface portion, said nose ring including a plurality of openings formed therein;

nose cowling conduit means positioned in said nose ring for communicating a heated gas to said plurality of openings formed in said nose ring and for creating a heated gas boundary layer on said inner circumferential surface of said inlet duct and for communicating said heated gas internally of said outer circumferential surface portion of said inlet duct; and duct means positioned between said inner and outer circumferential surface portions of said inlet duct and connected to said nose cowling conduit means for communicating said heated gas to said conduit means wherein said nose cowling assembly comprises a first bulkhead member positioned within said nose ring and a plurality of first spacer members interconnecting said first bulkhead member and an inner surface portion of said nose ring and wherein said first spacer members are circumferentially spaced about said first bulkhead member so as to form first passages between said first spacer members and which communicate directly with said inner circumferential surface of said inlet duct.

2. A nacelle anti-icing system as set forth in claim 1, further comprising:

a bullet assembly positioned radially within said nose cowling assembly and which includes a tip portion and a body portion connected to said tip portion, said tip portion including a plurality of openings formed therein; and bullet conduit means positioned in said bullet assembly and connected to said means for generating said heated gas for communicating said heated gas to an interior portion of said tip portion and to said plurality of openings formed in said tip portion for creating a heated gas boundary layer on said body portion of said bullet assembly.

3. A nacelle anti-icing system as set forth in claim 1, wherein said means for generating said heated gas further comprises means for generating a gas at a temperature from 150° F. to 280° F.

4. A nacelle anti-icing system as set forth in claim 2, wherein said means for generating said heated gas further comprises means for generating a gas at a temperature from 150° F. to 280° F.

5. A nacelle anti-icing system as set forth in claim 1, wherein said means for generating said heated gas further comprises means for generating a gas at a temperature from 150° F. to 280° F.

6. A nacelle anti-icing system as set forth in claim 1, further comprising means for connecting said nose ring to said inlet duct wherein said heated gas flows from said passages across said means for connecting said nose ring to said inlet duct.

7. A nacelle anti-icing system as claimed in claim 1, wherein said inlet duct further comprises a composite inlet duct which includes an inner and outer face sheet and a honey comb structure interconnecting said inner and outer face sheet and wherein said inner face sheet includes a plurality of openings formed therein for reduction of noise generated by said engine.

8. A nacelle anti-icing system as set forth in claim 1, wherein said bullet assembly further comprises a second bulkhead member positioned within said tip portion and a pluality of second spacer members interconnecting said second bulkhead member and an inner surface portion of said tip portion and wherein said second spacer members are circumferentially spaced about said second bulkhead member so as to form second passages between said second spacer members which communicate with said bullet conduit means.

9. A method for preventing icing of a nacelle for a jet engine having a nose cowling assembly which includes a nose ring, an inlet duct having an inner and outer circumferential surface and connected to said nose ring, said nose ring including a plurality of openings formed therein, and nose cowling conduit means positioned in said nose ring and connected to said plurality of openings and duct means positioned between said inner and outer circumferential surface of said inlet duct and connected to said nose cowling conduit means for communicating said heated gas to said conduit means wherein said nose cowling assembly comprises a first bulkhead member positioned within said nose ring and a plurality of first spacer members interconnecting said first bulkhead member and an inner surface portion of said nose ring and wherein said first spacer members are circumferentially spaced about said first bulkhead member so as to form first passages between said first spacer members and which communicate directly with said inner circumferential surface of said inlet duct, which comprises:

feeding a heated gas to said nose cowling conduit means and through said first passages directly to said inner circumferential surface of said inlet duct;

generating a heated gas boundary layer on said inlet duct so as to heat said inlet duct;

feeding said heated gas internally to an outer circumferential surface portion of said nose ring and said nose cowling assembly so as to heat said outer circumferential surface portion of said nose ring and said cowling assembly.

10. A method for preventing icing of a nacelle as set forth in claim 9, further comprising a bullet assembly positioned radially within said nose cowling assembly and which includes a tip portion and a body portion connected to said tip portion, said tip portion including a plurality of openings formed therein and bullet conduit means positioned in said bullet assembly and connected to said plurality of openings formed in said tip portion, wherein said method further comprises:

feeding said heated gas to said bullet conduit means so as to heat an interior portion of said tip portion; and creating a heated gas boundary layer on said body portion of said bullet assembly.

* * * * *